United States Patent
Nusbickel (12)

(10) Patent No.: US 6,205,440 B1
(45) Date of Patent: Mar. 20, 2001

(54) METHOD OF PROVIDING INFORMATION FROM QUERY RESULTS STORED AS SOURCE CODE FILES

(75) Inventor: Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/188,074

(22) Filed: Nov. 6, 1998

(51) Int. Cl.7 ................................................. G06F 17/30
(52) U.S. Cl. .............................................................. 707/2
(58) Field of Search .................................. 707/1, 2, 100

(56) References Cited

U.S. PATENT DOCUMENTS

| | | | |
|---|---|---|---|
| 5,787,431 | * 7/1998 | Shaughnessy | 707/100 |
| 5,944,781 | * 8/1999 | Murray | 709/202 |
| 5,999,941 | * 12/1999 | Anderson | 707/103 |
| 6,014,702 | * 1/2000 | King et al. | 709/227 |

* cited by examiner

*Primary Examiner*—Jack Choules
(74) *Attorney, Agent, or Firm*—Stephen C. Bongini; Fleit, Kain, Gibbons, Gutman & Bongini P.L.

(57) ABSTRACT

A method of providing information from a database to a user's system. According to the method, database query results are stored in a source code files and the source code files are compiled to provide compiled files. When information from the database is requested, at least one of the compiled files is downloaded to the user's system. In one preferred information providing method, the source code files are in the form of Java source code files and the compiled files are in the form of Java class files.18. Additionally, a method is provided for retrieving information from a database on a remote system for use on a user's system. A request for database information is transmitted over a network from the user's system to the remote system, and in response at least one compiled database result file is downloaded from the remote system. Each of the compiled database result files is used to store database query results in executable or bytecode form. In one preferred information retrieval method, the network includes the Internet and each of the compiled database result files is in the form of Java class file.

25 Claims, 4 Drawing Sheets

METHOD OF PROVIDING INFORMATION FROM QUERY RESULTS STORED AS SOURCE CODE FILES

BACKGROUND OF THE INVENTION

1. Field of the Invention

The present invention relates to databases, and more specifically to a method of providing information from a database at an increased speed.

2. Description of Related Art

There are now many centralized databases that can be accessed through a network, including read-only databases that are publicly accessible over the Internet. For example, there are numerous sites on the Internet that make available large informational databases containing information such as yellow pages listings and public document collections. A user typically accesses such a database over the Internet by using a dedicated program such as a Java applet running in a web browser. The Java applet and web browser operate to retrieve information from the database tables through a remote database server, and then display the information to the user. For example, if the requested information is to be displayed in a list box, the Java applet issues a query to the database, fetches the resulting information from the database, formats the information into a list box, and then displays the list box to the user.

While such Java applets can access information by directly querying remote database servers, the speed of obtaining the information can be horrendous for database queries that return numerous results (e.g., hundreds or thousands). Furthermore, the running of the database application across the Internet introduces further delays. When the process of retrieving information from a database server is slow, the user notices a performance degradation in the user interface (i.e., Java applet) that can be significant or even unacceptable. Thus, there is a recognized need to increase the speed of database information retrieval over networks, especially for database information that is read-only.

It has been proposed to improve database information retrieval in an Internet environment by having a Java applet running on a user's system use a web service such as a Java "servlet" to obtain database information. In such a case, the database queries are performed on the web server as opposed to having the Java applet query the database directly in the manner described above. Because the queries are performed on the web server, the database can be queried and the resulting information stored in memory in the servlet in advance (i.e., before any user requests for the information are received). However, this requires memory on the web server to be used for requests that may never actually be made. If more memory or storage capacity (e.g., hard disk space) is required, the cost of the web server is increased.

Additionally, any time the database information is reloaded, the information stored in memory becomes stale so the web server must be brought down and restarted to reload the memory with the proper results for the queries. This causes a disruption in service and may not even be an option for high availability applications. Furthermore, the servlet must manage and provide access to the stored results information so even more resources on the web server are consumed. As more and more of its resources are consumed, the web server becomes able to handle fewer and fewer user requests.

SUMMARY OF THE INVENTION

In view of these drawbacks, it is an object of the present invention to remove the above-mentioned drawbacks and to provide a method of providing information from a database at an increased speed without requiring the consumption of significant web server resources. Database result sets are segmented and stored in source code files. The source code files are compiled, and the compiled files are loaded into the execution environment of the user as needed. Thus, a user accesses the compiled database result files instead of the database information itself. In a network environment, this decreases the total throughput time for a user to receive database results and distributes the workload from the database and server to the user's system. This is especially advantageous for retrieving large read-only database result sets in an Internet environment.

Another object of the present invention is to provide a method of providing information from a database that can be used in high availability applications. A user retrieves information from a database through compiled database result files, and any newly loaded database information is reflected in the compiled database result files. Thus, the server does not need to be brought down to allow the user to receive newly loaded information. This allows the database information to be changed or updated without causing a disruption in service.

One embodiment of the present invention provides a method of providing information from a database to a user's system. According to the method, database query results are stored in a source code files and the source code files are compiled to provide compiled files. When information from the database is requested, at least one of the compiled files is downloaded to the user's system. In one preferred method, the source code files are in the form of Java source code files and the compiled files are in the form of Java class files.18.

Another embodiment of the present invention provides a method for retrieving information from a database on a remote system for use on a user's system. A request for database information is transmitted over a network from the user's system to the remote system, and in response at least one compiled database result file is downloaded from the remote system. Each of the compiled database result files is used to store database query results in executable or byte-code form. In one preferred method, the network includes the Internet and each of the compiled database result files is in the form of Java class file.

Other objects features, and advantages of the present invention will become apparent from the following detailed description. It should be understood, however, that the detailed description and specific examples, while indicating preferred embodiments of the present invention, arc given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 1:
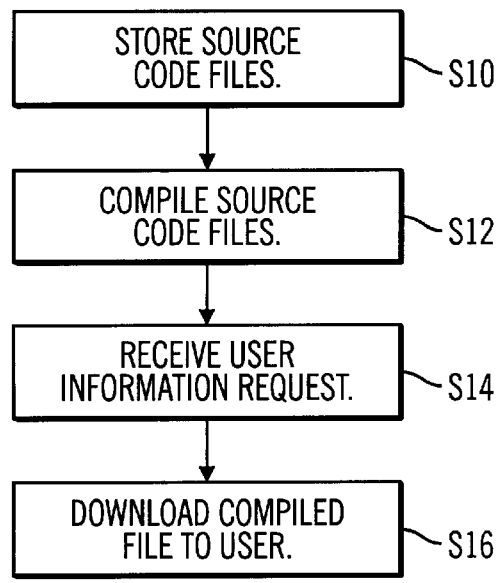
FIG. 1 is a flow chart showing a preferred process for providing information from a database.

FIG. 1 shows a flow chart of a process for providing information from a database in accordance with a preferred embodiment of the present invention. Database result source files are generated from the information in the database tables as part of the database information load process (step S10), and the generated source files are compiled into executable or bytecode form (step S12). When a user requests information from the database (step S14), the compiled database result files are accessed to retrieve the information from the database (step S16). In other words, a user retrieves information from the database by accessing the compiled database result files instead of the database information itself.

An exemplary application of the present invention is to a large read-only database (e.g., a yellow pages listings database) that is accessed over the Internet by a Java applet running on a user's system. Every time new or updated information is loaded into the database, a program is run to perform predetermined queries on the new database tables. Each result information set is written to a Java source code file, and the source code files are compiled into bytecode or Java class files that can be accessed by the web server. When the user requests information from the database, the Java applet retrieves the information by downloading the corresponding compiled result file from the database web server.

Because the database result sets are created during the database information load process and stored in Java class files, the Java applet running on the user's system can retrieve the new and updated database information immediately after the load process is completed without any need to restart the web server. Furthermore, user information requests cause the Java class files to be loaded into the memory of the user's system (i.e., the Internet client) instead of the web server. Therefore, extra memory is not required on the web server to store the result information sets and a special web service does not have to be written to manage such information. The storing of the Java class files on the web server with the applet consumes less storage space (e.g., hard disk space) than if the data was stored in an uncompiled state such as in HTML format. Additionally, the web server only has to deliver the class files to the Java applet as each is requested so the requested information can be quickly accessed and displayed to the user.

Figure 2:
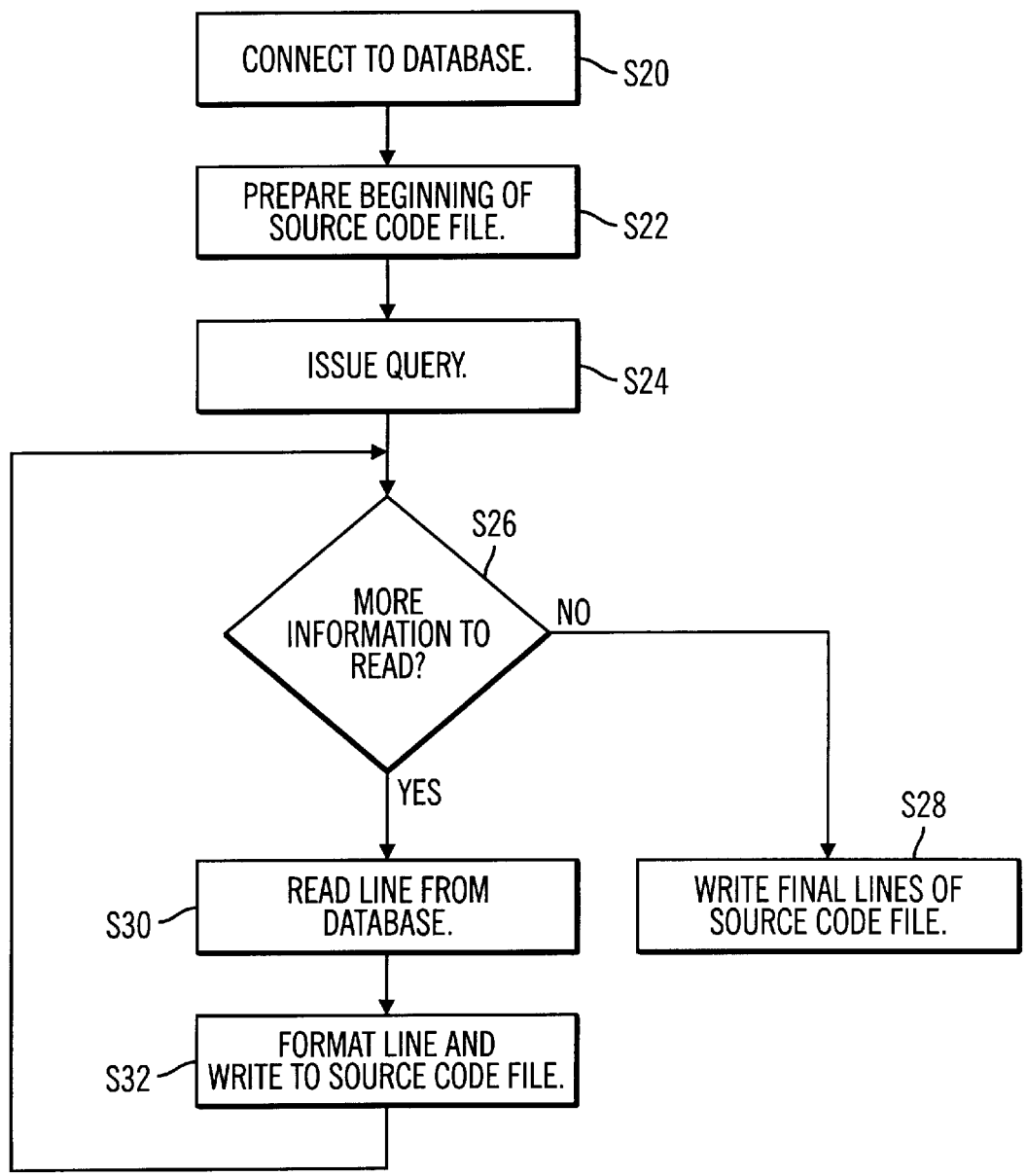
FIG. 2 is a flow chart showing a process for generating a source code file according to an embodiment of the present invention.
Figure 3:
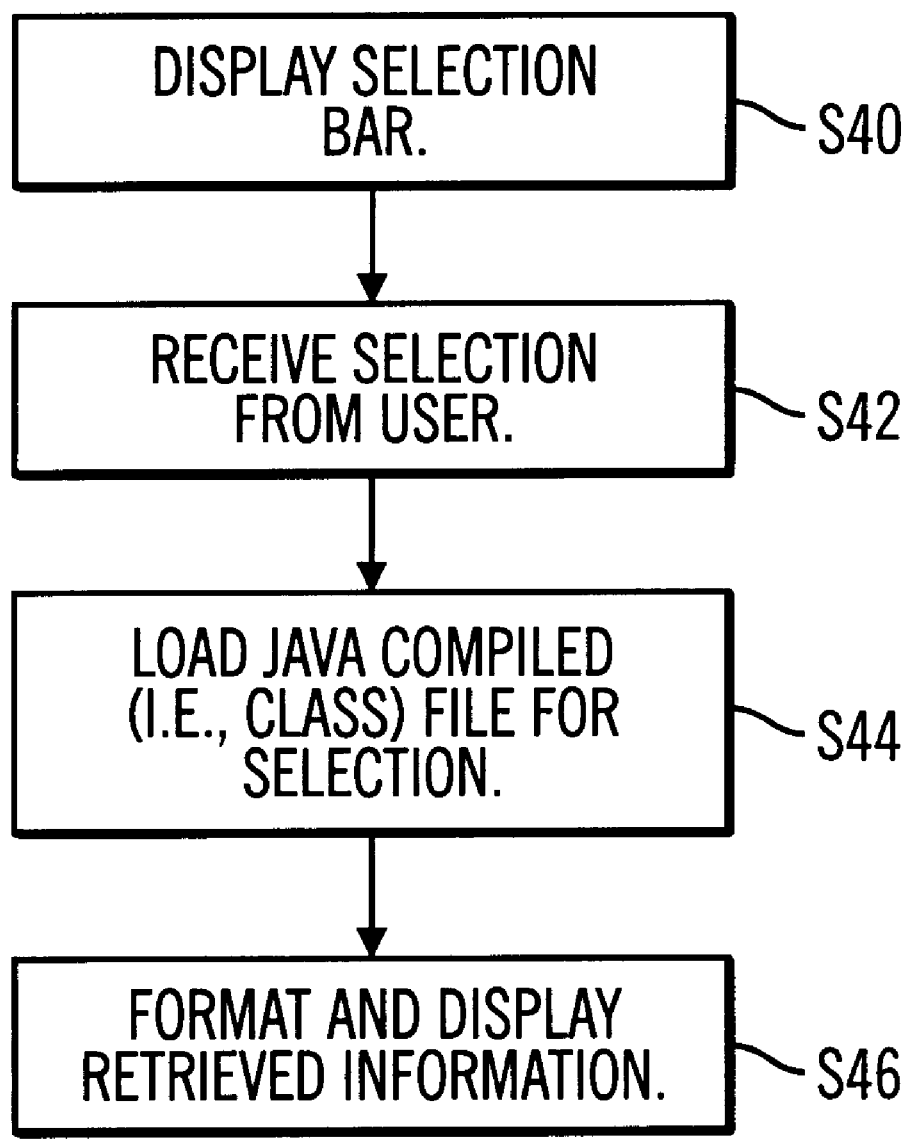
FIG. 3 is a flow chart showing a process for providing database results according to an embodiment of the present invention.

For purposes of illustration, an object framework for implementing an embodiment of the present invention in the environment of an Internet-accessible read-only yellow pages database will now be described in detail with reference to the flow charts of FIGS. 2 and 3. As part of the process of loading information into the database, a source code generator is used to generate source code files (e.g., Java, C++, or the like) based on predetermined database queries. In this embodiment, the class "MakeJavaFiles" is the base class that generates Java source files from the database information in order to store the resulting information sets for the predetermined queries. The generated source code files are compiled as part of the database load process.

The principal methods used by the source code generator will now be described. A first method, "getBeginningOfFile", provides the beginning portion of the Java source file being generated, and a second method, "getSQLStatement", retrieves the primary SQL (Structured Query Language) statement for one of the predetermined queries. A third method, "getQueryResults", runs the selected query on the database information and processes the result set that is returned. Additionally, a fourth method, "writeLine", is used when iterating through the result set to format the returned data and write it to a file. In other words, the writeLine method generates each line of the Java source code file on a line-by-line basis. A fifth method, "writeTables", is used to organize the data written by the writeLine method into data tables in the generated Java source code file.

Subclasses typically append information such as unique accessor methods to the getBeginningOfFile method. The getSQLStatement method is overridden by subclasses that supply the database query and the getQueryResults method is overridden by subclasses that provide the information to be retrieved from the database. Similarly, the writeLine method is also overridden, and the writeTables method is overridden by subclasses that must generate different tables due to non-conformance with the name and identifier format. As an example, the subclass "MakeHeadingsFile" is one of the subclasses of the "MakeJavaFiles" base class. The "MakeHeadingsFile" subclass generates separate Java source code files for storing the yellow pages headings beginning with each letter of the alphabet. In particular, one file, "aHeadings.java", is generated for storing yellow pages headings beginning with the letter "A", another file, "bHeadings.java", is generated for storing headings beginning with the letter "B", and so on.

In the "MakeHeadingsFile" subclass, the methods of the base class are overloaded for creating the headings source code files. After connecting to the database (step S20), the getBeginningOfFile method is used to supply the title and subtitle for the corresponding yellow pages headings as well as accessor methods (step S22), and the getSQLStatement method builds the actual database query for obtaining the yellow pages headings information and the corresponding heading identifiers from the database (step S24). At this point, it is determined if there is more information to be read from the database (step S26).

If so, the getQueryResults method fetches each heading name and the corresponding identifier from the database (step S30), and then the writeLine method writes data structures to the Java source code file for storing the yellow pages headings (step S32). In particular, a heading name and identifier pair of lines are written to represent each database record. For example, for a yellow pages heading of "Abdominal Supports Wholesale" that is retrieved from the database, the writeLine method writes the following two lines to the Java source file.

```
static private final String  k__name0  = "Abdominal Supports Wholesale";
static private final int     k__id0    = 512206;
```

After writing the data structure to the source code file, it is again determined if there is more information to be read from the database (step S26). When there is no more information to be read, the writeTables method writes data structures (e.g., arrays) to the source code file for holding the data written by the writeLine method (step S28). For example, in the source code file for all yellow pages headings beginning with "A", the writeTables method writes the following two lines to build arrays to reference all of the heading names and identifiers for that letter.

```
static private final String[]  k_nameList  = {k_name0, ..., k_name215};
static private final int[]     k_idList    = {k_id0, ..., k_id215};
```

The results of a database query are provided by another base class, "dbLinks", that contains access methods for obtaining information from the stored results (e.g., a string name and an integer identifier). Subclasses of the "dbLinks" base class are generated from the database tables and instantiated by a Java applet to retrieve the requested information for display to the user. The "dbLinks" base class provides accessor methods that are used by such a Java applet and overloaded by the subclasses. In particular, a first method, "getTitle", and a second method, "getSubTitle", respectively return the main title and the subtitle for the data stored in the class file. A third method, "getName", and a fourth method, "getID", respectively return the name and identifier at a specified index in the list of names and identifiers for the result set. Additionally, a representation of the requested data (e.g., for use by other methods) is returned by a fourth method, "getReturnString", and the number of database records in the class file is returned by a sixth method, "length".

As an example, the subclass "aHeadings" is one of the subclasses of the base class "dbLinks". The "aHeadings" class stores data to provide the results of a database query requesting yellow pages headings beginning with the letter "A". The Java applet running on the user's system instantiates the "aHeadings" class file and accesses the stored data using the methods of the base class "dbLinks". As described above, the "aHeadings.java" file contains data from the database for yellow pages headings and the corresponding identifiers such as the following.

```
static private final String  k_name0    = "Abdominal Supports Wholesale";
static private final int     k_id0      = 512206;
static private final String  k_name215  = "Awning & Tent Stores Retail";
static private final int     k_id215    = 599904;
```

The stored data is organized into simple arrays as follows.

```
static private final String[]  k_nameList  = {k_name0, ..., k_name215};
static private final int[]     k_idList    = {k_id0, ..., k_id215};
```

The subclass "aHeadings" overrides the accessor methods of the base class. For the "aHeadings" subclass, the getTitle method returns the main title of the data stored in the class (e.g., "Headings—A"), and the getSubTitle method returns the subtitle of the data (e.g., "Yellow Pages Headings"). Further, the getName method returns the name at the specified index in the list of query results, and the getID method returns the ID at the specified index in the list. For example, with respect to the "aHeadings" subclass, a call of "getName (7)" returns "Abrasives Wholesale" and a call of "getID(7)" returns a value of 440099. The getReturnString method returns a representation of the stored data for use by other methods. For example, the returned string could be a combination of a heading identifier and name for use by in other screen displays or further database queries. The length method returns the number of database records in the class file.

Figure 4A:
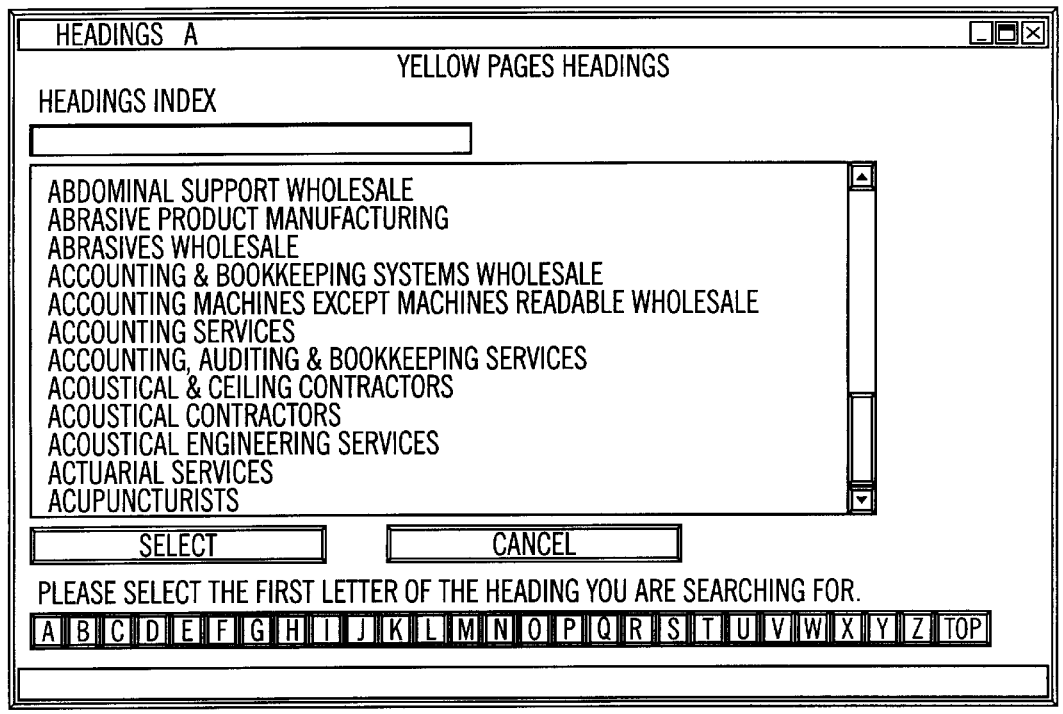
FIGS. 4(a) and 4(b) show sample user interface screens that are generated on the user's system.
Figure 4B:
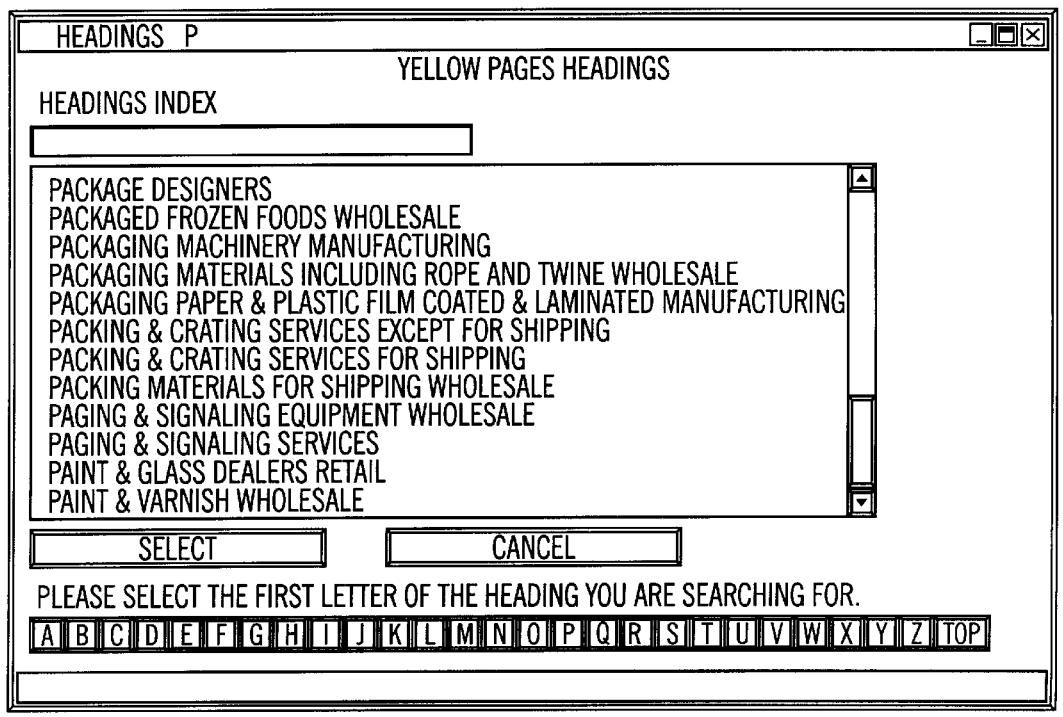

When the user connects to the database, the Java applet running on the user's system displays a page that includes a selection bar (step S40). The user activates a button on the selection bar to request the yellow pages headings beginning with a specified letter of the alphabet (step S42). In response, the Java applet running on the user's system retrieves the headings information from the corresponding Java class file (step S44), organizes the headings alphabetically, and then displays the organized headings to the user (step S46). FIGS. 4(a) and 4(b) show the user interface screens that result when the user requests headings beginning with the letters "A" and "P", respectively. Behind the scenes, individual Java class files are provided for the yellow pages headings of each letter of the alphabet (i.e., aHeadings.java, ..., zHeadings.java). Each Headings class file is a subclass of the base class "dbLinks", and implements the methods described above to build the user interface screen. The relevant portions of a sample Java applet for use on the user's system are listed in the attached Appendix for purposes of illustration.

The Headings class files reside on the web server with the Java applet and are downloaded to the user's system as each is referenced. A comparison of the Headings class files with corresponding HTML files for an actual yellow pages database showed the Headings class files to be from 18% to 58% smaller, with an average of 21% smaller. Further, local LAN timings showed that the information retrieval process of the present invention provides a performance improvement of about 59% over implementations in which an applet directly queries the database (for approximately 100 records). The performance improvement is expected to be even greater when using a modem to access a database over the Internet.

As previously explained, the present invention provides a method of providing information from a database at an increased speed without requiring the consumption of significant web server resources. Predetermined queries are run on a database, and the results are stored in source code files. The source code files are compiled, and the compiled files are downloaded to the user's system as needed. Thus, a user accesses the compiled database result files instead of the database information itself. In a network environment, this decreases the total throughput time for a user to receive database results and distributes the workload from the database and server to the user's system. Further, in a preferred embodiment, new source code files are generated and compiled whenever any new or updated information is loaded into the database. Therefore, the server does not need to be brought down to allow the user to receive newly loaded information.

Figure 5:
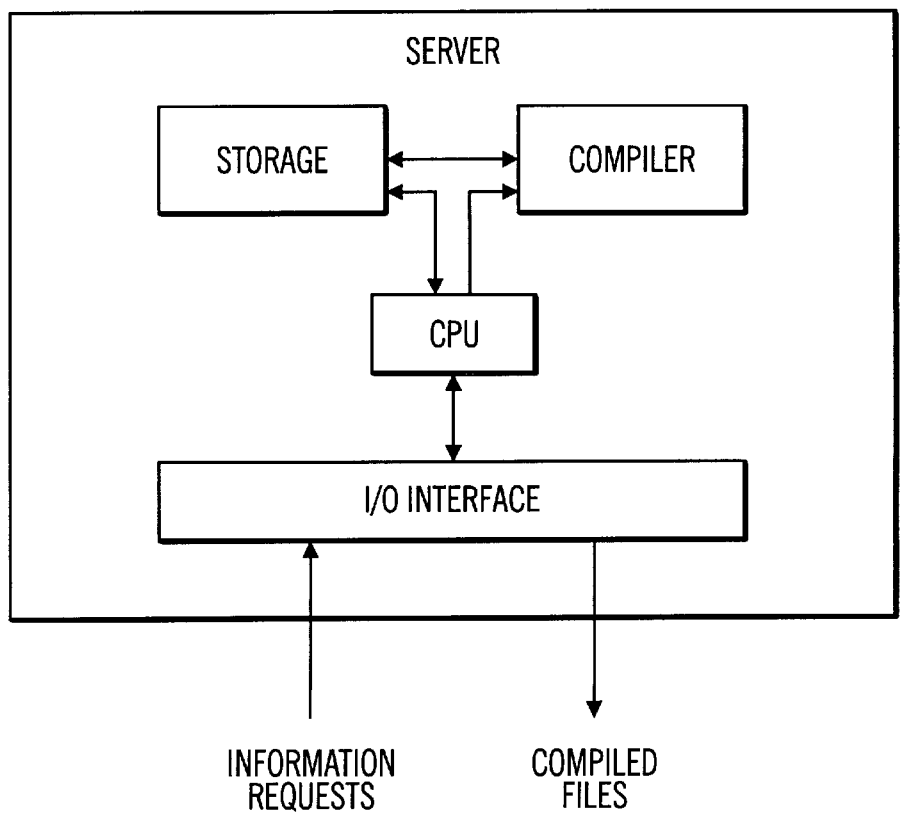
FIG. 5 is a block diagram showing a web server that implements the preferred database information providing process.

The database information providing processes of the present invention can be implemented in hardware, software, or a combination of the two. For example, such processes can be embodied in software programs that are stored on a computer-readable medium (e.g., magnetic disk, optical disk, or non-volatile memory) for execution by a computer. Similarly, such processes can be embodied in a web server like the one illustrated in FIG. 5. Additionally, the embodiments of the present invention described above relate to information retrieval using Java class files in an Internet environment. However, the process of the present invention is not so limited and could be used with other languages or systems and with any type of network. Other design choices, such as the number and division of the class files, the format of the stored information, and the programs for providing and retrieving the class files could also easily be adapted. Furthermore embodiments of the present invention may not include all of the features described above.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

APPENDIX

```
public class sampleApplet extends . . .
{
    . . .
    //----------------------------------------------------------------
    // The user interface control for the list of yellow pages headings
    //----------------------------------------------------------------
    // private static List    hotLinks = new List(20, false);
    . . .
    public boolean action(Event evt, Object arg)
    {
        . . .
        // User presses the button "A" below in the alphabet bar
        class Name = "aHeadings";
        //----------------------------------------------------------------
        // Load the class "aHeadings.class" from the web server
        //----------------------------------------------------------------
```

APPENDIX-continued

```
        dbLinks link =
        (dbLinks) Class.forName(className).newinstance();
        //----------------------------------------------------------------
        // We can now access the "link" variable to get no the yellow
        // pages headings starting with "A", using the methods defined
        // for the base class dbLinks.
        //----------------------------------------------------------------
        . . .
        //----------------------------------------------------------------
        // Build the list User Interface control with all the "A" headings
        for(int i=0; i<link.length(); i++)
        {
            // Add the yellow pages heading name to the display
            hotLinks.additem(link.getName(i));
        }
        . . .
    } // End action()
} // End sampleApplet class
```

What is claimed is:

1. A method of providing information from a database to a user's system, said method comprising the steps of:

storing database query results in a plurality of source code files;

compiling the source code files to provide a plurality of compiled files; and downloading at least one of the compiled files to the user's system when information from the database is requested.

2. The method as defined in claim 1, further comprising the step of running a plurality of predetermined queries on the database to provide the database query results.

3. The method as defined in claim 2, wherein the steps of running, storing, and compiling are performed as part of a database information load process.

4. The method as defined in claim 1, further comprising the step of receiving a request for database information from the user's system, the request being transmitted over a network.

5. The method as defined in claim 4, wherein the network includes the Internet.

6. The method as defined in claim 1, wherein the source code files are in the form of Java source code files and the compiled files are in the form of Java class files.

7. The method as defined in claim 1, wherein the database is a read-only database that is Internet-accessible.

8. A machine-readable medium encoded with a program for providing information from a database to a user's system, said program containing instructions for performing the steps of:

storing database query results in a plurality of source code files;

compiling the source code files to provide a plurality of compiled files; and downloading at least one of the compiled files to the user's system when information from the database is requested.

9. The machine-readable medium as defined in claim 8, wherein said program further contains instructions for performing the step of running a plurality of predetermined queries on the database to provide the database query results.

10. The machine-readable medium as defined in claim 9, wherein the steps of running, storing, and compiling are performed as part of a database information load process.

11. The machine-readable medium as defined in claim 8, wherein said program further contains instructions for performing the step of receiving a request for database information from the user's system, the request being transmitted over a network.

12. The machine-readable medium as defined in claim 11, wherein the network includes the Internet.

13. The machine-readable medium as defined in claim 8, wherein the source code files are in the form of Java source code files and the compiled files are in the form of Java class files.

14. The machine-readable medium as defined in claim 8, wherein the database is a read-only database that is Internet-accessible.

15. A web server for providing information from a database to a user's system, said web server comprising:

first storage means for at least temporarily storing a plurality of source code files containing database query results;

compilation means for compiling the source code files into a plurality of compiled files;

second storage means for storing the compiled files;

receiving means for receiving requests for database information from the user's system; and transmitting means for downloading compiled files to the user's system, wherein when the receiving means receives a request for database information from the user's system, the transmitting means retrieves at least one of the compiled files from the second storage means and downloads the at least one compiled file to the user's system.

16. The web server as defined in claim 15, wherein the source code files are in the form of Java source code files and the compiled files are in the form of Java class files.

17. The web server as defined in claim 15, wherein the database is a read-only database, and the receiving means and transmitting means are coupled to the Internet.

18. A method of retrieving information from a database on a remote system for use on a user's system, said method comprising the steps of:

transmitting a request for database information from the user's system to the remote system, the request being transmitted over a network; and downloading at least one compiled database result file from the remote system, each compiled database result file storing database query results in executable or bytecode form.

19. The method as defined in claim 18, wherein the network includes the Internet.

20. The method as defined in claim 18, wherein each compiled database result file is in the form of Java class file.

21. The method as defined in claim 20, further comprising the step of generating the request for database information through a Java applet running on the user's system.

22. A machine-readable medium encoded with a program for retrieving information from a database on a remote system for use on a user's system, said program containing instructions for performing the steps of:

transmitting a request for database information from the user's system to the remote system, the request being transmitted over a network; and downloading at least one compiled database result file from the remote system, each compiled database result file storing database query results in executable or bytecode form.

23. The machine-readable medium as defined in claim 22, wherein the network includes the Internet.

24. The machine-readable medium as defined in claim 22, wherein each compiled database result file is in the form of Java class file.

25. The machine-readable medium as defined in claim 24, wherein said program further contains instructions for performing the step of generating the request for database information through a Java applet running on the user's system.

\* \* \* \* \*